United States Patent
Moriyama et al.

(10) Patent No.: US 8,153,753 B2
(45) Date of Patent: *Apr. 10, 2012

(54) ALICYCLIC OR AROMATIC POLYAMIDES, POLYAMIDE FILMS, OPTICAL MEMBERS MADE BY USING THE SAME, AND POLYAMIDE COPOLYMERS

(75) Inventors: Hideki Moriyama, Otsu (JP); Akimitsu Tsukuda, Otsu (JP)

(73) Assignee: Toray Industries, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/533,006

(22) PCT Filed: Apr. 7, 2004

(86) PCT No.: PCT/JP2004/004982
§ 371 (c)(1),
(2), (4) Date: Dec. 1, 2005

(87) PCT Pub. No.: WO2004/039863
PCT Pub. Date: May 13, 2004

(65) Prior Publication Data
US 2006/0106193 A1      May 18, 2006

(30) Foreign Application Priority Data
Oct. 31, 2002   (JP) .................................. 2002-317364

(51) Int. Cl.
*C08G 69/08*       (2006.01)
(52) U.S. Cl. ........ 528/310; 528/125; 528/128; 528/170; 528/172; 528/174; 528/176; 528/183; 528/185
(58) Field of Classification Search .................. None
See application file for complete search history.

(56) References Cited

U.S. PATENT DOCUMENTS

| | | | | |
|---|---|---|---|---|
| 4,833,214 A | * | 5/1989 | Teramoto et al. | 525/420 |
| 5,580,950 A | * | 12/1996 | Harris et al. | 528/350 |
| 6,232,386 B1 | * | 5/2001 | Vargo et al. | 524/434 |
| 6,274,220 B1 | * | 8/2001 | Tsukuda et al. | 428/141 |
| 6,589,663 B2 | * | 7/2003 | Handa et al. | 428/474.4 |
| 7,054,049 B2 | * | 5/2006 | Murakami et al. | 359/256 |
| 7,511,112 B2 | * | 3/2009 | Moriyama et al. | 528/86 |
| 2003/0116270 A1 | * | 6/2003 | Hawa et al. | 156/307.1 |
| 2004/0100599 A1 | * | 5/2004 | Yamaoka et al. | 349/117 |

FOREIGN PATENT DOCUMENTS

| | | | |
|---|---|---|---|
| JP | 62-190224 A | | 8/1987 |
| JP | 62-204201 A | | 9/1987 |
| JP | 62-230823 A | | 10/1987 |
| JP | 02-233725 | | 9/1990 |
| JP | 5-222188 A | | 8/1993 |
| JP | 07-149892 | * | 6/1995 |
| JP | 10-508048 | | 4/1998 |
| JP | 11-49876 A | | 2/1999 |
| JP | 2000-190385 | * | 7/2000 |

OTHER PUBLICATIONS

Nemoto et al "Polyamides for nonlinear ortics..," Chem mater, 1996, 8, 1527-1534.*
Rogers, H.G., et al., "Highly Amorphous, Birefringent, Para-Linked Aromatic Polyamides," *Macromolecules*, 1985, vol. 18, pp. 1058-1068.

* cited by examiner

*Primary Examiner* — Gregory Listvoyb
(74) *Attorney, Agent, or Firm* — DLA Piper LLP (US)

(57) ABSTRACT

A polyamide having at least an alicyclic or aromatic group exhibiting a light transmittance of 80% or more in the wavelength region of 450 to 700 nm is produced by using an aramide polymer comprising specific structural units at an amount of 50 mol % or more. Colorless transparent alicyclic or aromatic polyamide films having high rigidity and high thermal resistance are provided by using the polyamide. Further, the invention provides various optical members made by using the polyamide or the polyamide films, and polyamide copolymers.

24 Claims, No Drawings

ALICYCLIC OR AROMATIC POLYAMIDES, POLYAMIDE FILMS, OPTICAL MEMBERS MADE BY USING THE SAME, AND POLYAMIDE COPOLYMERS

TECHNICAL FIELD

This disclosure relates to alicyclic or aromatic polyamides and polyamide films suitable for use in optical field, protection member field, etc.

BACKGROUND ART

Although various colorless transparent materials have been investigated depending upon various uses such as functional optical films, disc substrates, etc., the functions and performance required for the materials themselves have become more precise and more high-level accompanying with a rapid change of information equipment to be small-sized and light-weight and a development of display elements to be high-fineness.

Particularly, in film fields, films using polycarbonate-group, cyclopolyolefin-group and cellulose-group resins have been used as display members such as polarizing plates or retardation plates and as disc protection films.

Thermoplastic resins having a high transparency such as a polycarbonate are employed broadly as an optical use, and they are considered to be used as optical films such as retardation films and substrates for discs. Especially, a retardation film is one of the important structural members deciding a contrast of a reflection type color liquid crystal display. Although polycarbonates used at the present time are described in, for example, JP-A-4-204503 and JP-A-9-304619 do not have a satisfactory wavelength dispersion property. In order to make a reflection type color liquid crystal display high-contrast, an increase of the wavelength dispersion property of a polymer film used as a retardation film has become one of the technical subject matters.

Further, although these films are excellent in transparency, the thermal resistance and the mechanical properties (for example, rigidity) thereof are not always enough. Therefore, irregularity in dimensional or optical property is liable to occur, and in particular, by an environmental variation at the time of processing or using, they are likely to change in dimensional or optical property. Furthermore, if a raise of the processing temperature or a further thinning is required in the future, there is a limit for such an application in the above-described conventional films.

On the other hand, although a polyimide is well known as a polymer having a thermal resistance, because a usual polyimide is colored with a brown color, it cannot be applied for an optical use. As a polyimide having a transparency, for example, a wavelength plate is disclosed in Japanese Patent No. 3259563. However, because the polyimide according to this invention takes two hours or more for thermal imidization reaction, it is difficult to use this polyimide industrially. Further, this patent document does not touch Young's modulus which is an important factor for an optical film, at all.

Further, although aromatic polyamide films have high thermal resistance and mechanical properties and they can satisfy the thermal resistance and mechanical properties required for retardation films or protection films sufficiently, a para-oriented aromatic polyamide such as PPTA is colored with a yellow color, and it was difficult to develop such a polyamide for an optical field. For example, although a thermal-resistance transparent conductive film is disclosed in JP-B-7-89452, the transmittance at a wavelength of 600 nm of this film is low to be 71% even in the examples, and because the transmittance at a lower wavelength side is further low, it is not practical. Further, although discloses an aromatic polyamide film having a specific structure, a film having a high transparency cannot be obtained from the reason that the molar fraction of the specific structure is low, etc.

It could be advantageous to provide polyamides and polyamide films having a high rigidity, a high thermal resistance and a high transparency, and optical members using the same and copolymers of the polyamides.

SUMMARY

We provide a polyamide having at least an alicyclic or aromatic group exhibiting a light transmittance of 80% or more for all lights with wavelengths of from 450 nm to 700 nm, and a polyamide film comprising this polyamide.

Further, we provide a polyamide comprising a structural unit represented by the chemical formula (I), (II), (III) or (IV) described later and satisfying the following equations (1) to (3) when molar fractions of structural units represented by the chemical formulae (I), (II), (III) and (IV) described later are referred to as "l", "m", "n" and "o", respectively, and a polyamide film comprising this polyamide.

$$50 < l+m+n \leq 100 \quad (1)$$

$$0 \leq m,n,o \leq 100 \quad (2)$$

$$0 \leq o \leq 50 \quad (3)$$

We also provide various optical members using the polyamide or the polyamide film, and copolymers of polyamide.

It is preferred that the thickness of the film is in a range of 1 μm to 100 μm. Further, it is preferred that the light transmittance for a light with a wavelength of 400 nm is 60% or more, and it is preferred that the Young's modulus in at least one direction of the film is 4 GPa or more. Furthermore, it is preferred that the thermal shrinkage in at least one direction of the film at a heat treatment condition of 200° C. and 30 minutes is 1% or less.

Various optical films such as retardation plates, protection films or substrates for flat panel displays can be made thinner and/or higher thermal-resistance.

In our polyamides and polyamide films, the light transmittance for all lights with wavelengths of from 450 nm to 700 nm is 80% or more. Preferably, the light transmittance is 85% or more, and more preferably, 90% or more. If the light transmittance for all lights with wavelengths of from 450 nm to 700 nm is 80% or more, application to various optical uses such as retardation plates and protection films becomes possible. Here, because the polyamide has a large refractive index and exhibits a large surface reflection, it is difficult to obtain a measurement value greater than 90% as the light transmittance in a case where the interface is air. For example, when our polyamide having a refractive index of 1.7 is placed in air (refractive index: 1.0), the reflection is presented by the following equation.

$$\text{Reflection (\%)} = (1.7-1.0)^2/(1.7+1.0)^2 = 6.72\%$$

In consideration of a process wherein a light having entered into a polyamide layer from an air layer passes to the air layer, an incident light of 100% reflects by 6.72% at the time of the incidence from the air layer to the polyamide layer, and it becomes 93.28%. Further, because this light reflects again by 6.72% among 93.28% at the time of going out from the polyamide layer, only 87% passes even in a case where absorption and diffusion are not present in the polyamide layer at all. However, because an optical film such as a retardation film is used generally by being adhered with another material, the reflection frequently becomes smaller than that in the above-described case where the interface is air. Further, it is understood that the light transmittance of the polyamide is very close to a theoretical limit value considering a surface reflection, and the absorption and diffusion in the film are small. Therefore, it can be used suitably as an optical film.

The above-described polyamide and polyamide film may be either alicyclic or aromatic. As an alicyclic polyamide (film), for example, there are a semi-alicyclic semi-aromatic polyamide such as poly-1,4-norbornene terephthalic amide or poly-1,4-cyclohexane terephthalic amide and an overall alicyclic polyamide such as poly-1,4-cyclohexane-1,4-cyclohexane amide. As an aromatic polyamide (film), for example, there are a polyamide such as polyparaphenylene terephthalic amide whose aromatic ring is directly linked or linked by only an amide linkage, and a polyamide such as poly-2,2-bis[4-(p-aminophenoxy)phenyl]propyl terephthalic amide which is directly linked to a linkage unit and which has a structure containing methylene, ether, etc. other than an amide linkage.

The polyamide can be used as various processed forms such as a varnish, a thin membrane, a film, a sheet and a molded material. Among these, when processed into a thin membrane or a film, the feature of the polyamide can be utilized and it is preferable. In a case of being sued as a film, the thickness is preferably in a range of 0.01 µm to 1,000 µm, more preferably in a range of 1 µm to 100 µm, further more preferably in a range of 2 µm to 30 µm, still further more preferably in a range of 2 µm to 20 µm, and still further more preferably in a range of 2 µm to 10 µm. If the thickness of the film is more than 1,000 µm, there is a case where the light transmittance decreases. Further, if the thickness of the film is less than 0.01 µm, there is a case where the processing property decreases even if it employs a high-rigidity aromatic polyamide. By using a polyamide having at least an alicyclic or aromatic group, in particular, by using an aromatic polyamide, it can be achieved to make a film rigid, and to let the film exhibit excellent properties as an optical or electrical film even if the film is very thin as compared with other materials. Where, the thickness of the film is, of course, to be selected appropriately depending on the use.

In the polyamide, it is possible to control the light transmittance by controlling the molecular structure, and to use properly depending upon the use. In the use requiring that a light transmittance is large as to a light with a short wavelength, for example, in a protection membrane for a recording medium using a blue or violet laser such as a BD (Blu-ray disc) or an AOD (advanced optical disc), or in a protection membrane for a germicidal lamp or a ultra-violet ray excitation fluorescent substance, it is preferred that the light transmittance for a light with a wavelength of 400 nm of the polyamide is 60% or more. Further, by such a light transmittance for a light with a wavelength of 400 nm of 60% or more, decomposition and deterioration of the polyamide ascribed to ultraviolet rays can be suppressed. More preferably, the light transmittance for a light with a wavelength of 400 nm is 65% or more, further more preferably, 75% or more, particularly preferably, 90% or more. By the condition where the light transmittance for a light with a wavelength of 400 nm, which is in a region of near ultraviolet ray, is 60% or more, the transparency of the film increases remarkably. Further, in the above-described uses, it is also preferred that the light transmittance for a light with a wavelength of 350 nm is 30% or more.

A high thermal resistance is required also for a material employed in an equipment becoming a high temperature condition such as a projector or an equipment used under a high-temperature environmental condition such as a display device used in a vehicle interior. This can be realized by a condition where the material has a high glass transition temperature. In the polyamide and the polyamide film, the glass transition temperature is preferably 120° C. or higher, more preferably 200° C. or higher, further more preferably 300° C. or higher, particularly preferably 350° C. or higher. By having a high glass transition temperature, it becomes possible to bear a vapor-deposition temperature of a metal such as ITO (indium oxide.tin), and it becomes possible to deposit the metal such as ITO similarly in a vapor deposition on a glass.

In the polyamide and the polyamide film, it is preferred that a refractive index in at least one direction at a sodium D ray is 1.6 or more. In a case where the polyamide (film) is used as a resin having a high refractive index, it may be used either solely or together with another material. For example, it is possible to further increase the refractive index by dispersing particles having a high refractive index such as titanium oxide in the polyamide. As examples of particles to be dispersed, for example, there are $TiO_2$, $CeO_2$, $ZrO_2$, $In_2O_3$, etc. It is preferred that the content of these particles 0.01 wt % or more and less than 99.9 wt % relative to the whole of the mixture of the polyamide or the polyamide film and the particles. The content is more preferably 20 wt % or more and less than 99.5 wt %, further preferably 50 wt % or more and less than 99.5 wt %.

If the refractive index at a sodium D ray is less than 1.6, for example, in a case where a high refractive-index membrane is formed as a combination with a low refractive-index membrane, there is a case which reduces the antireflection effect. The above-described refractive index is preferably 1.65 or more, more preferably 1.7 or more. The larger the refractive index is, the higher the effect as a high refractive-index membrane is, and when utilized as an antireflection membrane, a sufficient effect can be exhibited by a thinner membrane. Further, in a case where the polyamide is applied to an optical fiber or an optical waveguide, the larger the above-described refractive index is, the smaller the optical loss can be suppressed.

Although the upper limit of the refractive index is not particularly restricted, from the viewpoint of making the membrane, etc., it is preferably 5.0 or less, more preferably 2.0 or less. If the refractive index is more than 5.0, there is a case where it becomes difficult to make a membrane having a small optical irregularity. Where, the above-described refractive index was determined using the following measurement device based on the method defined in JIS-K7105-1981. However, the range to be determined is 1.87 or less in refractive index.

Measurement device: Abbe refractometer 4T (produced by Atago Co., Ltd)
    Light source: sodium D ray
    Measurement temperature: 25° C.
    Measurement humidity: 65% RH
    Mount liquid: methylene iodide The refractive index can be determined by the following method in a case of more than 1.87. In this case, the result measured at 590 nm is determined as the refractive index at a sodium D ray.

Method: ellipsometry
    Measurement Device: Retardation measuring device NPDM-1000 (produced by Nikon Corporation)
    Light source: halogen lamp
    Detector: Si—Ge Polarizer·analyzer: Gram Tomson
Rotational frequency of analyzer: 2 times
Incident angle: 45° to 80°, 0° (dz)
Wavelength for measurement: 590 nm However, there is a use which does not require a high refractive index. Of course, the refractive index should be selected depending upon the use. As a method for intentionally reducing the refractive index, an introduction of fluorine atoms into a molecular chain can be raised.

In the polyamide film, it is preferred that the Young's modulus in at least one direction is 4 GPa or more, because the film can resist against a force loaded at the time of being processed or used, and the flatness becomes better. Further, by the Young's modulus in at least one direction of 4 GPa or more, it becomes possible to form the film thin.

If the Young's moduli in all directions are less than 4 GPa, there is a case where a deformation occurs at the time of processing. Although there is no upper limit on the Young's modulus, if the Young's modulus is more than 20 GPa, the toughness of the film decreases, and there is a case where the film formation and the processing become difficult. The Young's modulus is preferably 8 GPa or more in at least one direction, more preferably 10 GPa or more in at least one direction.

Further, it is preferred that the ratio Em/Ep of the maximum value of the Young's modulus (Em) to the Young's modulus in a direction perpendicular to the direction of the maximum Young's modulus (Ep) is in a range of 1.1 to 3, because the cutting property at the time of processing further increases. More preferably the ratio is in a range of 1.2 to 2.5, further more preferably in a range of 1.5 to 2.5. If the Em/Ep is more than 3, there is a case where the film is rather liable to break.

Further, it is preferred that the elongation at break of the polyamide film in at least one direction is 5% or more, more preferably 10% or more, in the measurement based on JIS-K7127-1989, because the frequency of film breakage at the time of forming and processing becomes less. Although the upper limit of the elongation at break is not particularly restricted, it is about 250% in practice.

Further, it is preferred that the dielectric constant at 1 kHz of the polyamide film is 4 or less, more preferably 3.5 or less, most preferably 2 or less. By such a small dielectric constant, a delay of signal, when an electronic circuit is formed directly on an optical film, can be reduced.

In the film, it is preferred that the thermal shrinkage in at least one direction, at the time of being heat treated at 200° C. for 30 minutes under a condition where a tension substantially is not applied, is 1% or less, because a dimensional variation at the time of processing and a variation of retardation property can be suppressed. The thermal shrinkage is more preferably 0.5% or less, further more preferably 0.3% or less. The thermal shrinkage is defined by the following equation.

Thermal shrinkage (%)=
((length before heat treatment−
length after heat treatment and cooling)/
(length before heat treatment)×100

Although the above-described thermal shrinkage is preferably as low as possible, the lower limit is about 0.1% in practice. If the thermal shrinkage in at least one direction determined by the above-described condition is 1% or less, it becomes possible to form an electric circuit on a film and to bond electronic parts to a film by solder. Further, because the film is hard to be strained at the time of being laminated to another part as an optical member, it is unlikely that an irregularity in optical property such as a retardation occurs. Moreover, because the tensile strength is high, the orientation is not disturbed, and it is unlikely that an irregularity in optical property such as a retardation occurs.

Although optical films can be classified roughly into a group for use where an optical anisotropy preferably exist such as polarizing films and retardation films and a group for use where an optical anisotropy preferably does not exist (optically isotropic) such as substrates for liquid crystal displays and protection films, the film can be controlled in optical anisotropy, and it can be used adequately for both uses of optical anisotropy and isotropy.

Film Exhibiting No Optical Anisotropy:

When the aromatic polyamide film is used as a substrate of a liquid crystal display and a protection film, it is preferred that a retardation of a light with a wavelength of 550 nm of the film is less than 10 nm. Such a retardation value can be realized, for example, by not performing a stretching at the time of forming a film, or by stretching a film at uniform draw ratios in respective directions (in a biaxial stretching, by setting the same draw ratio in both the longitudinal and transverse directions). In a case of being employed for the above-described uses, this retardation value is more preferably 5 nm or less, further more preferably 2 nm or less. By such a very small retardation value of a light with a wavelength of 550 nm being 10 nm or less, the film is suitable as a protection film, in particular, as a protection film for an optical disc.

Film Exhibiting an Optical Anisotropy:

In this case, by a condition where a retardation of a light with a wavelength of 550 nm of the film is in a range of 10 to 2,000 nm, the advantages can be further increased in a case where the film is used as an optically anisotropic film such as a polarizing film or a retardation film. When the retardation is in this range, an excellent color tone repeatability can be exhibited in a case where the film is used as an optical retardation film, in particular, as a wide-band ¼ wavelength retardation plate. Such a retardation value can be realized, for example, by performing a stretching in a specific direction (unidirectionally), or by stretching a film at a draw ratio biased in a specific direction. In a case of being employed for the above-described uses, this retardation value is more preferably in a range of 100 to 550 nm, further more preferably in a range of 130 to 380 nm.

Further, to satisfy the following equation with respect to the dispersion property in retardation, that is, the dependency of wavelength on retardation, becomes a preferable embodiment in a case of being applied to the use of a ¼ wavelength retardation plate.

$$R(450)/R(550)=1.03 \text{ to } 1.25$$

$$R(650)/R(550)=0.80 \text{ to } 0.95$$

Where, R is a retardation (nm), and the value in the parenthesis represents a wavelength (nm).

For a ¼ wavelength retardation plate, it is required to make the retardation ¼ of each wavelength in the wavelength region of the visual ray. In order to achieve this, generally, a method for laminating films having a same retardation dispersion property or different retardation dispersion properties so that their principal axes are not arranged in parallel to each other is employed. As another part for the lamination, a cyclopolyolefin-group, polycarbonate-group, triacetyl cellulose-group or acrylic-group film is used, and especially, a cyclopolyolefin film is preferably used.

In a case where the retardation dispersion property of the polyamide film is in the above-described range, when the polyamide film is laminated with a cyclopolyolefin-group, polycarbonate-group, triacetyl cellulose-group or acrylic-group film, etc, a further better retardation dispersion property can be exhibited as a ¼ wavelength retardation plate, as compared with the polycarbonate-group or triacetyl cellulose-group film used in the conventional technology.

The retardation dispersion property of the film is more preferably in the following ranges.

$R(450)/R(550)=1.1$ to $1.22$ $R(650)/R(550)=0.82$ to $0.93$

As a retardation plate, there is a single layer type formed by a single layer of a retardation film other than a laminate type wherein two or more retardation films are laminated. In a case where the polyamide film is used for this single layer type, it is preferred that, the longer the wavelength is, the larger the retardation becomes. In particular, it is preferred that the relationship of $R(450)/R(550)$ is satisfied.

The retardation is represented by a function of a thickness and a birefringence, and in a case where the film is used for a substrate for an optical disc, etc., a small retardation is preferable. Therefore, it is preferred that the birefringence of a light with a wavelength of 550 nm of the film is 0 or more and less than 0.1.

On the other hand, in a case of being used as a retardation film, it is preferred that the birefringence of a light with a wavelength of 550 nm of the film is 0.1 or more and less than 0.5. By this, a target retardation can be obtained by a thinner film.

In the polyamide film, it is preferred that a coefficient of moisture absorption at a condition of 25° C. and 75% RH is 6% or less, more preferably 4% or less, further more preferably 2% or less, because a variation of property due to the variation of humidity at the time of using or processing becomes smaller. Where, the "coefficient of moisture absorption" is determined by the following method. First, a film is sampled by about 0.5 g, after it is heated at 120° C. for 3 hours for dehumidification, the temperature is lowered down to 25° C. so as not to absorb moisture, and the weight after the temperature lowering is measured precisely at a unit of 0.1 mg (the weight at this time is referred to as W0). Next, it is left at 25° C. under an atmosphere of 75% RH for 48 hours, thereafter, the weight is measured, the measured weight is referred to as W1, and the coefficient of moisture absorption is determined using the following equation.

Coefficient of moisture absorption (%)=$((W1-W0)/W1)\times 100$

Although a lower coefficient of moisture absorption is preferred, the lower limit is about 0.03% in practice.

It is preferred that a coefficient of thermal expansion from 80° C. to 120° C. is in a range of 50 to 0 ppm/° C. The coefficient of thermal expansion is determined in a temperature-lowering process after heating up to 150° C. When an initial sample length at 25° C. and 75% RH is referred to as L0, a sample length at a temperature of T1 is referred to as L1 and a sample length at a temperature of T2 is referred to as L2, the coefficient of thermal expansion from T1 to T2 is determined by the following equation.

Coefficient of thermal expansion (ppm/° C.)=$(((L2-L1)/L0)/(T2/T1))\times 10^6$

The coefficient of thermal expansion is more preferably in a range of 30 to 0 ppm/° C., further more preferably in a range of 20 to 0 ppm/° C.

Further, it is preferred that a coefficient of moisture expansion at 25° C. from 30% RH to 80% RH is in a range of 50 to 0 ppm/% RH. The method for determining the coefficient of moisture expansion is as follows. First, a sample is fixed in a high-temperature and high-humidity vessel so that the width of the sample is 1 cm and the length of the sample is 15 cm, it is dehumidified down to a predetermined humidity (about 30% RH), and after the length of the sample film becomes constant, humidification is carried out (about 80% RH). Although the sample begins to elongate by moisture absorption, the moisture absorption reaches an equilibrium condition after about 24 hours, and the elongation of the film also reaches an equilibrium condition. The coefficient of moisture expansion is calculated from the amount of elongation at that time by the following equation.

Coefficient of moisture expansion (ppm/% RH)=
(elongation amount (cm)/(sample length (cm)×
(difference in humidity))×$10^6$ The coefficient of moisture expansion is more preferably in a range of 30 to 0 ppm/% RH, further more preferably in a range of 20 to 0 ppm/% RH. By small coefficient of thermal expansion and coefficient of moisture expansion, a dimensional variation due to environment becomes small, and an irregularity with respect to an optical property such as a retardation is unlikely to occur.

The polyamide and polyamide film have a large pencil hardness. The pencil hardness is preferably HB or more, more preferably H or more, and further more preferably 3H or more. Particularly, if the pencil hardness is 3H or more, because a polyamide membrane also acts as a hard coating layer, such a condition is preferred.

The polyamide can have both of a property of a high transparency and properties of high rigidity and high thermal resistance by containing the following structural units. Namely, it is preferred that the polyamide comprises a structural unit represented by the following chemical formula (I), (II), (III) or (IV) and satisfies the following equations (1) to (3) when molar fractions of structural units represented by the following chemical formulae (I), (II), (III) and (IV) are referred to as "l", "m", "n" and "o", respectively.

$50 < l+m+n \leq 100$ (1)

$0 \leq l,m,n,o \leq 100$ (2)

$0 \leq o \leq 50$ (3)

Chemical Formula (I):

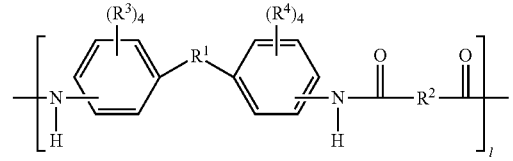

$R^1$: a group having at least a ring structure,
$R^2$: an aromatic group,
$R^3$: an arbitrary group, and
$R^4$: an arbitrary group.
Chemical Formula (II):

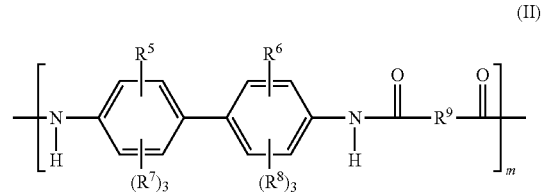

$R^5$: an electron-withdrawing group,
$R^6$: an electron-withdrawing group,
$R^7$: an arbitrary group,
$R^8$: an arbitrary group, and
$R^9$: an aromatic group.

Chemical Formula (III):

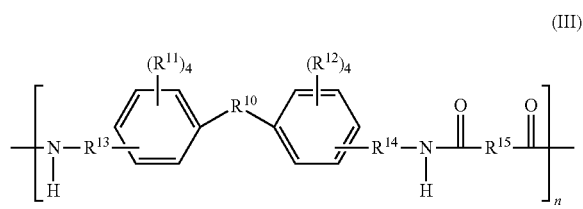

$R^{10}$: a group containing Si, a group containing P, a group containing S, a halogenated hydrocarbon group or a group containing an ether linkage (where, structural units having these groups may be present together in a molecule.)

$R^{11}$: an arbitrary group, $R^{12}$ an arbitrary group, $R^{13}$: linked directly or a group having a carbon number of 6 to 12 which has at least a phenyl group as an inevitable component, $R^{14}$: linked directly or a group having a carbon number of 6 to 12 which has at least a phenyl group as an inevitable component, and $R^{15}$: an aromatic group.

Chemical Formula (IV):

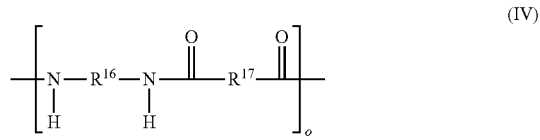

$R^{16}$: an aromatic group, and $R^{17}$: an aromatic group.

At least one structural unit selected from the group consisting of chemical formulae (I), (II), (III) and (IV) may be contained, and of course, all the structural units may be contained, and only a part of the structural units may be contained. An important point is that, when molar fractions of the structural units represented by the chemical formulae (I), (II) and (III) are referred to as "l", "m" and "n", respectively, the value of l+m+n is 100 or less and more than 50. The value of l+m+n is preferably 80 or more, and more preferably, the value of l+m+n is 100. If the value of l+m+n is 50 or less, because the contribution due to structural units for coloring becomes greater than the effect due to the above-described structural units, it becomes difficult to obtain a film having a high transparency. (Although an aromatic polyamide film containing a structural unit represented by the above-described chemical formula (I) is disclosed in JP-A-7-149892, because the molar fraction of the chemical formula (I) is restricted from 0.1 mol % to 20 mol %, an advantage of making colorless and transparent cannot be obtained.

Further, it is important that the above-described "l", "m", "n" and "o" satisfy $0 \leq l, m, n, o \leq 100$. Namely, the "l", "m", "n" and "o" may be present, respectively, or if the range of $50 < l+m+n \leq 100$ is satisfied, a non-existing unit may be present.

Further, it is also important that, when the molar fraction of the structural unit represented by the chemical formula (IV) is referred to as "o", $0 \leq o \leq 50$ is satisfied. There is a case where the structural unit represented by the chemical formula (IV) serves to coloring of a polymer, if this molar fraction "o" is more than 50, it becomes difficult to obtain a film having a high transparency.

As long as the ranges represented by the above-described equations are satisfied, other components, for example, polyimide, polyetheretherketone, polyetherketoneketone, polyethersulfone and cyclopolyolefin and other structural units, for example, imide, ester, ether and ketone may be contained. Aromatic or ring compounds are preferred as the other components or the other structural units.

Although it is considered that the coloring of polyamide is ascribed to a charge-transfer complex in a molecule and between molecules, any of the chemical formulae (I), (II) and (III) obstructs to form a charge-transfer complex in a molecule and between molecules, and it is considered that they serve to make the polyamide transparent. Moreover, by introducing the structural unit represented by the chemical formula (IV), while the transparency achieved by the chemical formulae (I), (II) and (III) is maintained, the mechanical properties, the thermal properties, etc. can be increased.

The chemical formula (I) takes a structure represented by $R^1$ in which a ring structure and a molecular chain are linked in a hinge-like form and which is called as a carde structure, and it is considered that the electron cloud of $R^1$ cuts the electron cloud of the molecular chain and forming of a charge-transfer complex in a molecule is obstructed. For this purpose, it is preferred that $R^1$ has at least one ring structure. Where, the "ring structure" means an aromatic ring, an aliphatic ring, a heterocyclic ring, etc., and the element forming the ring is not particularly restricted. Further, the form thereof is not particularly limited, such as a single ring, a condensed ring or a spiro ring. Among these ring structures, the $R^1$ is preferably a group having at least a ring structure with 5 members, a ring structure with 6 members, or a ring structure with 7 members. Further, it is preferably a ring group among the group represented by the following chemical formulae (V). Among these, the most preferable structure is a fluorene group.

Chemical Formula (V):

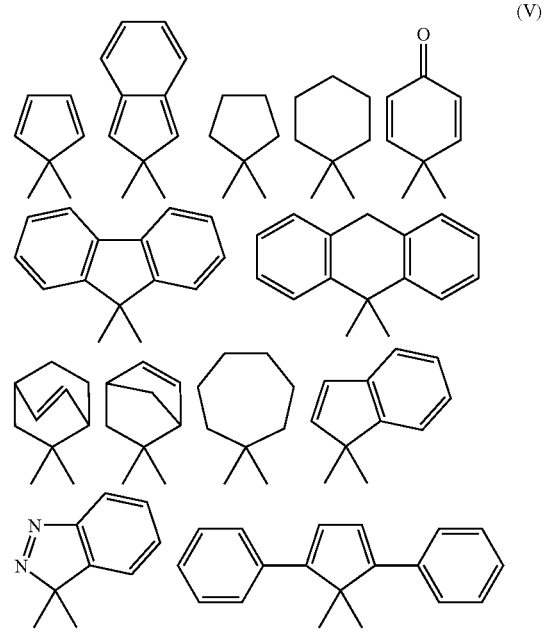

There is a case where a ring structure with 3 or 4 members closes its ring, because the strain in the structure is great. Further, also in a ring structure with 8 or more members, there is a case where the structure is transformed into another structure by the strain. Because a strain is small and stable in a ring structure with 5, 6 or 7 members, it is considered that such a ring structure can serve to increase the transparency as well as the thermal resistance. Furthermore, a high bulk is preferable in order to obstruct the forming of a charge-transfer complex three-dimensionally, and a condensed ring structure in which two or more rings are condensed is preferred. As such a condensed ring structure, for example, there is a fluorene ring of rings with 6-5-6 members. Although a structure condensed with 4 or more rings is also preferred in order to obstruct the forming of a charge-transfer complex, it is necessary to use a raw material having a large molecular weight at the time of polymerization, there is a case where a problem such as a problem hard to dissolve it in a solvent occurs.

In the chemical formula (I), although $R^2$ is not particularly restricted as long as it is an aromatic group, preferably it is a group represented by the following chemical formulae (VI). Chemical Formula (VI):

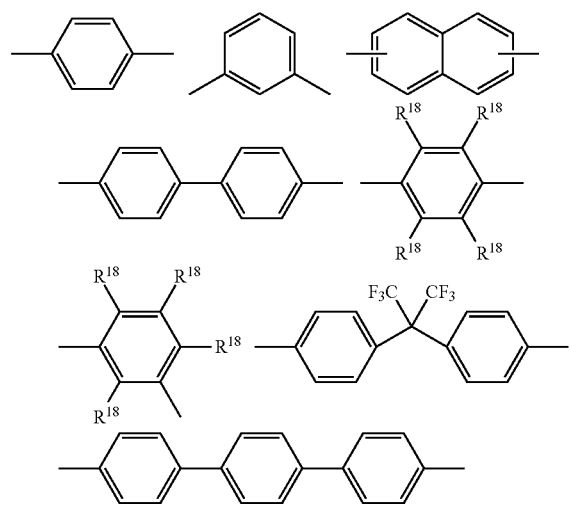

(VI)

Where, $R^{18}$: independently respectively, H, D (deuterium), halogen, aromatic group, hydrocarbon having a carbon number of 1 to 5, or halogenated hydrocarbon having a carbon number of 1 to 5

Among these, more preferable groups are a phenyl group and a chlorophenyl group. In the chemical formula (I), for the purpose of giving a thermal resistance and a rigidity, for example, it is preferably a rigid aromatic group such as paraphenylene, 2-substituted paraphenylene or biphenyl. On the other hand, although a polycyclic aromatic group such as tarphenyl or anthracene is rigid, the group has many π-electons and there is a case where it causes coloring of polyamide. Further, in a case of increasing a transparency in the region of a near ultraviolet ray or a ultraviolet ray, $R^2$ is preferably a methaphenyl group, 1,3-hexafuluoropropyl-2,2-biphenyl group or a cyclohexane group. Since these groups have a flexibility, although a rigidity may decrease, a transparency for a light with a shorter wavelength increases.

In the chemical formula (I), $R^3$ and $R^4$ are not restricted, they may be arbitrary groups. Preferably, each of them is —H, an aliphatic group having a carbon number of 1 to 5, —$CF_3$, —$CCl_3$, —OH, —F, —Cl, —Br, —$OCH_3$, a silyl group or an aromatic group. Because $R^3$ and $R^4$ are substituents for side chain, the influence given by them to the properties of the polyamide is small as compared with that due to a substituent for principal chain, but it is preferred that they are appropriately introduced in order to improve the optical property, the wettability and the solubility in solvent. For example, for the purpose of increasing the wettability or the dye affinity due to dichroic pigment, —OH or —COOH can be introduced.

In the chemical formula (II), $R^5$, $R^6$, $R^7$ and $R^8$ are all —H, there is a case where a charge-transfer complex is formed and the polyamide is colored. In the present invention, by introducing an electron-withdrawing group independently as each of $R^5$ and $R^6$, the forming of a charge-transfer complex is obstructed, and the transparency of the polyamide is increased. Where, the "electron-withdrawing group" means a group indicating a positive value in Hammett substituent constant, and for example, —$CF_3$, —$CCl_3$, $Cl_3$, $CBr_3$, —F, Cl, —Br, —I, —$NO_2$, —CN, —$COCH_3$, —$CO_2C_2H_5$, etc. can be raised. Among these, more preferable groups are —$CF_3$, $CCl_3$, —$NO_2$ and —CN, and the most preferable group is —$CF_3$. The structural units having these groups may be present together in the polyamide molecule. The above-described Hammett constant is explained, for example, in pages 308-311 of "Great Organic Chemistry" 1 st vol. edited by M. Kotake, published by Asakura Book Corporation.

Further, in the chemical formula (II), $R^7$ and $R^8$ are not particularly restricted, and arbitrary groups may be used within a range which does not damage the above-described purpose. Preferable groups are the above-described electron-withdrawing group, —H, an aliphatic group having a carbon number of 1 to 5, a silyl group or an aromatic group.

In the chemical formula (II), although $R^9$ is not particularly restricted as long as it is an aromatic group, preferably it is a group represented by the above-described chemical formula (VI). More preferably, it is a phenyl group or a chlorophenyl group. In the chemical formula (II), $R^9$ is preferably a rigid aromatic group such as paraphenylene, 2-substituted paraphenylene or biphenyl for the purpose of giving a thermal resistance or a rigidity. On the other hand, although a polycyclic aromatic group such as tarphenyl or anthracene is rigid, the group has many π-electons and there is a case where it causes coloring of polyamide. Further, in a case of increasing a transparency in the region of a near ultraviolet ray or a ultraviolet ray, $R^9$ is preferably a methaphenyl group, 1,3-hexafuluoropropyl-2,2-biphenyl group or a cyclohexane group. Since these groups have a flexibility, although a rigidity may decrease, a transparency for a light with a shorter wavelength increases.

In the chemical formula (III), if an appropriate group is not selected as $R^{10}$, there is a case where the polyamide is colored. Accordingly, by selecting a group containing Si, a group containing P, a group containing S, a halogenated hydrocarbon group or a group containing an ether linkage (where, structural units having these groups may be present together in a molecule) as the $R^{10}$, the forming of a charge-transfer complex is obstructed, and the transparency of the polyamide is increased. Concretely, —$SO_2$—, —O—, —$C(CF_3)_2$—, —$(CCl_3)_2$—, —$(CBr_3)_2$—, —$CF_2$—, —$CCl_2$— and —$CBr_2$— are preferable, and —$SO_2$— and —$C(CF_3)_2$— are most preferable.

In the chemical formula (III), $R^{11}$ and $R^{12}$ are not particularly restricted, they may be arbitrary groups. Preferably, each of them is —H, an aliphatic group having a carbon number of 1 to 5, —$CF_3$, —$CCl_3$, —OH, —F, —Cl, —Br, —$OCH_3$, a silyl group or an aromatic group. Because $R^{11}$ and $R^{12}$ are substituents for side chain, the influence given by them to the properties of the polyamide is small as compared with that due to a substituent for principal chain, but it is preferred that they are appropriately introduced in order to improve the optical property, the wettability and the solubility in solvent. For example, for the purpose of increasing the wettability or the dye affinity due to dichroic pigment, —OH or —COOH can be introduced.

Further, in the chemical formula (III), other groups can be introduced into the positions of $R^{13}$ and $R^{14}$. Although, of course, they may be directly linked as they are, for example, —Ph—, —O—Ph—, —C(CF$_3$)$_2$—Ph—, etc. may be introduced. However, the most preferable structure is the structure linked directly.

In the chemical formula (III), although $R^{15}$ is not particularly restricted as long as it is an aromatic group, preferably it is a group represented by the above-described chemical formula (VI). More preferably, it is a phenyl group or a chlorophenyl group. In the chemical formula (III), $R^{15}$ is preferably a rigid aromatic group such as paraphenylene, 2-substituted paraphenylene or biphenyl for the purpose of giving a thermal resistance or a rigidity. On the other hand, although a polycyclic aromatic group such as tarphenyl or anthracene is rigid, the group has many π-electons and there is a case where it causes coloring of polyamide. Further, in a case of increasing a transparency in the region of a near ultraviolet ray or a ultraviolet ray, $R^{15}$ is preferably a methaphenyl group, 1,3-hexafuluoropropyl-2,2-biphenyl group or a cyclohexane group. Since these groups have a flexibility, although a rigidity may decrease, a transparency for a light with a shorter wavelength increases.

It is further preferred that the structural units represented by the above-described chemical formulae (I) and (IV) and the molar fraction of the structural unit represented by the chemical formula (I) is 50% or more. In a case where a polyamide is produced industrially, usually, a raw material supply system comprising a pair of storage tanks, a measuring tank, pipes, pumps, etc. is necessary relatively to a single kind of raw material. For example, in a case where all the structural units represented by the formulae (I), (II), (III) and (IV) are contained, because at least four kinds of diamines and one kind of acidic dichloride are necessary as raw materials, five or more raw material supply systems become necessary. However, in a case where only the structural units represented by the formulae (I) and (IV) are contained, because the raw material supply systems are enough at least 3 sets and at most 4 sets, the cost for making the raw material supply systems and the running cost can be preferably reduced. Further, although, in a case where many kinds of raw materials are used, the time for polymerization becomes long depending upon the number of the kinds, in a case where only the structural units represented by the formulae (I) and (IV) are contained, because the number of the kinds of the raw materials are 3 or 4 and it is small, the time for polymerization is short, and it is possible to reduce the cost for the polymerization, and therefore, such a condition is preferable.

Further, it is also preferable that the structural units represented by the above-described chemical formulae (II) and (IV) and the molar fraction of the structural unit represented by the chemical formula (II) is 50% or more. By employing such a structure, the system cost and the production cost can be reduced as compared with those in a case where all the structural units represented by the formulae (I), (II), (III) and (IV) are contained.

It is further preferable is that the structural units represented by the above-described chemical formulae (III) and (IV) and the molar fraction of the structural unit represented by the chemical formula (III) is 50% or more. By employing such a structure, the system cost and the production cost can be reduced as compared with those in a case where all the structural units represented by the formulae (I), (II), (III) and (IV) are contained.

By preparing a polyamide film containing the polyamide comprising the above-described structure, it is excellent in transparency and it can be used suitably for optical use, etc.

Hereinafter, the methods for producing the polyamide and the composition thereof, and for preparing a film as a formed material, will be explained, taking an aromatic polyamide as an example, but, of course, the present invention is not restricted by this.

As a method for preparing a polyamide solution, that is, a raw material solution for making a film, various methods can be employed, and for example, a low-temperature solution polymerization, an interfacial polymerization, a melt polymerization, a solid phase polymerization, etc. can be used. In a case of the low-temperature solution polymerization, that is, a method for obtaining polyamide from carboxylic dichloride and diamine, it is synthesized in an aprotic organic polar solvent.

As the carboxylic dichloride, terephthalic dichloride, 2chloro-terephthalic dichloride, isophthalic dichloride, naphthalene dicarbonyl chloride, biphenyl dicarbonyl chloride, tarphenyl dicarbonyl chloride, 2phloro-terephthalic dichloride, 1,4-cyclohexane carboxylic dichloride, etc can be raised, and most preferably, terephthalic dichloride or 2chloro-terephthalic dichloride is used.

As the diamine, for example, 4,4'-diaminodiphenylether, 3,4'-diaminodiphenylether, 4,4'-diaminodiphenylsulfone, 3,3'-diaminodiphenylsulfone, 2,2'-ditrifluoromethyl-4,4'-diaminobiphenyl, 9,9-bis(4-aminophenyl)fluorene, 9,9-bis(4-amino-3-mehtylphenyl)fluorene, bis[4-(4-aminophenoxy)phenyl]sulfone, bis[4-(3-aminophenoxy)phenyl]sulfone, 2,2-bis[4-(4-aminophenoxy)phenyl]propane, 2,2-bis(4-aminophenyl)hexafluoropropane, etc. can be raised, and preferably, 4,4'-diaminodiphenylsulfone, 3,3'-diaminodiphenylsulfone, 2,2'-ditrifluoromethyl-4,4'-diaminobiphenyl, 9,9-bis(4-aminophenyl)fluorene, 9,9-bis(4-amino-3-mehtylphenyl)fluorene, 1,4-cyclohexanediamine and 1,4-norbornenediamine can be raised.

In the polyamide solution, when acidic dichloride and diamine are used as monomers, hydrogen chloride generates as a by-product, and in a case where this is neutralized, an inorganic neutralizer such as calcium hydroxide, calcium carbonate or lithium carbonate, or an organic neutralizer such as ethylene oxide, propylene oxide, ammonia, triethylamine, triethanolamine or diethanolamine, is used. Further, the reaction isocyanate with carboxylic acid is carried out in an aprotic organic polar solvent at a condition present with a catalyst.

In a case where the polymerization is carried out using two or more kinds of diamines, a reaction method having respective steps for adding the diamines one kind by one kind, adding acidic dichloride at 10-99 mol % relative to a diamine and reacting them, thereafter, adding another diamine, and further adding acidic dichloride and reacting them, and a method for mixing all diamines and adding them, and thereafter, adding acidic dichloride and reacting them, can be employed. Further, in a case where two or more kinds of acidic dichlorides are used, similarly, a method having steps, a method for adding simultaneously, etc. can be employed. In any case, the molar ratio of total diamine to total acidic dichloride is preferably in a range of 95:105 to 105:95, and when the ratio is out of this range, it becomes difficult to obtain a polymer solution suitable for molding.

In the production of polyamide, as the aprotic organic polar solvent to be used, for example, a sulfoxide-group solvent such as dimethylsulfoxide or diethylsulfoxide, a formamidegroup solvent such as N,N-dimethylformamide or N,N-diethylformamide, an acetamide-group solvent such as N,N-dimethylacetamide or N,N-diethylacetamide, a pyrrolidone-group solvent such as N-methyl-2-pyrrolidone or N-vinyl-2-pyrrolidone, a phenol-group solvent such as phenol, o-, m- or p-cresol, xylenol, halogenated phenol or catechol, or hexamethylphospholamide or γ-butyrolactone, can be raised. Although it is preferred that these are used solely or as a mixture, further it is possible to use an aromatic hydrocarbon. Further, as a solvent for accelerating the dissolution of the polymer, a salt of an alkali metal or an alkaline earth metal can be added by 50 wt % or less.

For the purpose of surface forming or improvement of processing property, an inorganic or organic additive may be contained in the polyamide. Although the additive may be colorless or colored, a colorless and transparent additive is preferable not to damage the features of the polyamide film. As the additive for the purpose of surface forming, for example, $SiO_2$, $TiO_2$, $Al_2O_3$, $CaSO_4$, $BaSO_4$, $CaCO_3$, carbon black, carbon nanotube, fullerene, zeolite, and other metal fine powder can be raised as an inorganic particle. Further, as the preferable organic particle, for example, particle comprising an organic polymer such as crosslinked polyvinylbenzene, crosslinked acryl, crosslinked polystyrene, polyester, polyimide, polyamide or fluoro resin, or an inorganic particle covered with any of these organic polymers, can be raised.

Where, it is possible to add a pigment to the polyamide film, thereby making a colored film. As the pigment, both of an inorganic pigment such as cobalt blue and an organic pigment such as phthalocyanine can be suitably used. Although, in the conventional aromatic polyamide film, the film itself is colored and therefore a target color tone cannot be obtained even if the above-described pigment is added, in the film, because the color of the film itself is little, it becomes possible to obtain a film having a color tone of the original pigment. The film thus colored can be used, for example, as a luminaire member such as a reflector or a cover of a head light of a vehicle or an airplane, and further, can be used suitably for lighting equipment used in a shop or housing.

Further, a preferable copolymer comprising the above-described polyamide at a content of 50 wt % or more is also provided. As the other polymer component, for example, polycarbonate, cyclopolyolefin, polystyrene, etc. can be raised, and this copolymer has both of the features of the polyamide and the features of the other polymer component, for example, can be used suitably for a retardation plate, a protection film and a substrate. Further, when a polymer having a negative birefringence is formed in a copolymer together with the polyamide according to the present invention, the copolymer preferably exhibits a good wavelength dispersion property.

Further, a photosensitive polyamide giving a photosensitivity to the above-described polyamide also can be produced. By this, a development to the uses such as optical adhesives and lenses becomes possible. As the method for giving a photosensitivity, for example, there is a method for substituting the end of the principal chain of the polyamide for a reactive group and further adding a photo-curing agent, etc.

Next, preparation of a film will be explained. The raw material solution for forming a film prepared in the above is made into a film by a so-called solution film formation method. There are a dry-wet method, a dry method and a wet method, and although any method may be employed, here, the dry-wet method will be explained as an example.

In a case where a film is formed by a dry-wet method, the raw material solution is extruded from a die onto a supporting member such as a drum or an endless belt to make a thin film, and then, a solvent is vaporized from the thin film and the thin film is dried so as to be given with a self-holding property. The drying can be carried out, for example, at a condition in a temperature range of from a room temperature to 220° C. and for a time within 60 minutes. Further, if the surface of the drum or the endless belt used in this drying process is as flat as possible, a film having a flat surface can be obtained. The film having finished the above-described drying process is peeled from the supporting member and introduced into a wetting process, demineralization and removing of solvent are carried out, and further, stretching, drying and heat treatment are carried out to make a film.

The stretching is carried out preferably in a range of a plane magnification of 0.8 to 8 (the "plane magnification" is defined as a value determined by dividing an area of a film after stretching with an area of a film before stretching. A value of 1 or less means being relaxed.), more preferably in a range of 1.3 to 8. Further, the heat treatment is carried out at a temperature in a range of 200° C. to 500° C., preferably in a range of 250° C. to 400° C., for a time of several seconds to several minutes. Further, it is effective to gradually cool the film after stretching or heat treatment, and it is effective to cool the film at a cooling speed of 50° C./sec. or lower. The film obtained from the polyamide may be either a single layer film or a laminated film. Furthermore, the stretching is preferably carried out in the thickness direction in addition to the plane direction, because the film can exhibit a good property as a retardation film.

The film can be applied to any use requiring a transparency such as an arbitrary retardation film including a ¼ wavelength retardation film and a ½ wavelength retardation film, a polarizing film, a circular polarizing film, a protection film, a protection film for an optical disc, a touch panel, a substrate for flexible print circuit, a substrate for semiconductor mounting, a substrate for multi-layer laminated circuit, a circuit substrate, a capacitor, a printer ribbon, an acoustic vibration plate, a substrate for a flat panel display, a base film for a solar battery (a substrate for a solar battery) or a protection film for a solar battery. Among these, particularly when used as structural members of various film members represented by display members such as polarizing plates, retardation plates, anti-reflection plates, substrates, etc. and optical recording members such as substrates for optical discs and protection films thereof, because the film is excellent in dimensional stability at the time of processing or using and in stability of optical properties, it can be suitably used.

For the above-described uses, either a substantially non-oriented film (isotropic optically) or an oriented film (anisotropic optically) realized by carrying out stretching may be used, and both films can be suitably applied, but, particularly, an oriented film is more preferable. Concretely, when the film is applied to a polarizing plate, a retardation plate, in particular, the above-described ¼ wavelength retardation plate, the advantages can be obtained.

Further, as a use other than a film form, it can be utilized suitably for an optical fiber, an optical waveguide, a lens, a microlens array, an optical filter, an antireflection membrane, a coating material to another material, a laminated formed with another material, a molded product, etc.

EXAMPLES

The methods used for determining properties and for estimating advantages are as follows.
(1) Young's Modulus:
The Young's modulus was determined at a temperature of 23° C. and a relative humidity of 65% using a robot tensilon RTA (produced by Orientec Co., Ltd). The specimen was prepared by referring to the film forming direction or the movement direction of a bar coater as MD direction and a direction perpendicular to the MD direction as TD direction and by making a sample with a width of 10 mm and a length of 50 mm in MD direction or TD direction. The tensile speed was 300 mm/min. Where, a point at which the load have passed through 1 N from the start of the examination was defined as an origin of elongation.

(2) Tensile Strength:

The tensile strength was determined at a temperature of 23° C. and a relative humidity of 65% using a robot tensilon RTA (produced by Orientec Co., Ltd). The specimen was prepared by referring to the film forming direction or the movement direction of a bar coater as MD direction and a direction perpendicular to the MD direction as TD direction and by making a sample with a width of 10 mm and a length of 50 mm in MD direction or TD direction. The tensile speed was 300 mm/min. Where, a point at which the load have passed through 1 N from the start of the examination was defined as an origin of elongation.

(3) Elongation at Breakage:

The elongation at breakage was determined at a temperature of 23° C. and a relative humidity of 65% using a robot tensilon RTA (produced by Orientec Co., Ltd). The specimen was prepared by referring to the film forming direction or the movement direction of a bar coater as MD direction and a direction perpendicular to the MD direction as TD direction and by making a sample with a width of 10 mm and a length of 50 mm in MD direction or TD direction. The tensile speed was 300 mm/min. Where, a point at which the load have passed through 1 N from the start of the examination was defined as an origin of elongation.

(4) Pencil Hardness:

The pencil hardness was determined base on JIS K-5400-1979.

Measurement device: Heidon surface property tester (5) Glass Transition Temperature (Tg) [DMA Measurement]

Measurement device: viscoelasticity measuring device EXSTAR6000 (produced by Seiko Instruments Inc.)

Measurement frequency: 1 Hz

Temperature elevation speed: 2° C./min.

Glass transition temperature (Tg): Based on ASTM E1640-94, an inflection point of E' was defined as Tg. Because data could not be obtained in a region higher than 360° C. by the limit of the device, such a case was indicated as "360° C. or more" in the Table, and in such a case the measurement due to DSC was carried out.

(6) Glass Transition Temperature (Tg) [DSC Measurement]

Measurement device: robot DSC RDC220 (produced by Seiko Instruments Inc.)

Temperature elevation speed: 10° C./min.

Glass transition temperature (Tg): An inflection point of DSC curve was defined as Tg.

(7) Total Light Transmittance:

The total light transmittance was determined using the following measurement device.

Measurement device: direct reading haze meter HGM-2DP (for C light source, produced by Suga Test Instruments Co., Ltd.)

Light source: halogen lamp 12V, 50 W

Light-intercepting property: 395-745 nm

Optical condition: based on JIS-K7105-1981

Where, in a case where a block-like film or a resin having a form other than a thin-film form is determined, the measurement is carried out using a sample having a thickness of 10 μm. In a case where it is difficult to prepare a sample, the determination is carried out by converting the thickness into 10 μm using the following equation. Of course, even in a case where only a sample having a thickness more than 10 μm can be obtained, the following conversion method can be applied.

Light transmittance or Total light transmittance at the condition of 10 μm (%): T10

Thickness (μm): L (application range: 0.1 angstrom-10 mm)

Light transmittance or Total light transmittance at the condition of a thickness of L: TL $$T10=100-((100-TL)/(10/L))$$

However, in a case where the thickness is more than 10 μm and the total light transmittance is 80% or more, because it is explicit that a total light transmittance is 80% or more also at a condition of 10 μm, the conversion into a thickness of 10 μm is not always necessary.

(8) Haze:

The haze was determined using the following measurement device.

Measurement device: direct reading haze meter HGM-2DP (for C light source, produced by Suga Test Instruments Co., Ltd.)

Light source: halogen lamp 12V, 50 W

Light-intercepting property: 395-745 nm

Optical condition: based on JIS-K7105-1981

(9) Transparency of Film (Light Transmittance):

A light transmittance for a light with each wavelength was determined using the following measurement device.

$$\text{Light transmittance (\%)}=(T1/T0)\times 100$$

Where, T1 is an intensity of a light having passed through a sample, and T0 is an intensity of a light having passed through the same distance in air except passing through a sample.

Measurement device: UV measurement device U-3410

(produced by Hitachi Instruments Service Co., Ltd.)

Range of wavelength: 300 nm to 800 nm

Measurement speed: 120 nm/min.

Measurement mode: transmitting

In a case where a block-like film or a resin having a form other than a thin-film form is determined, the measurement is carried out using a sample having a thickness of 10 μm. In a case where it is difficult to prepare a sample, the determination is carried out by converting the thickness into 10 μm using the following equation. Of course, even in a case where only a sample having a thickness more than 10 μm can be obtained, the following conversion method can be applied.

Light transmittance or Total light transmittance at the condition of 10 μm (%): T10

Thickness (μm): L (application range: 0.1 angstrom-10 mm)

Light transmittance or Total light transmittance at the condition of a thickness of L: TL $$T10=100-((100-TL)/(10/L))$$

Further, in a case where a reflectance can be determined, an absorption coefficient is calculated from the reflectance, and the light transmittance can be determined by conversion using the following equation. However, in a case where a light transmittance at a certain measurement wavelength (x nm) is y % or more when calculated by the above-described equation, because the light transmittance at this measurement wavelength (x nm) is y % or more also when converted by the following equation, a further conversion is not necessary.
Reflectance (%): R
Absorption coefficient (%/μm): a $$T10 = a \times L + TL - a \times 10$$

$$a = (100 - R - TL)/L$$

However, in a case where the thickness is more than 10 μm and the light transmittance at a certain measurement wavelength (x nm) is y % or more, because it is explicit that a light transmittance at this measurement wavelength (x nm) is y % or more also at a condition of 10 μm, the conversion into a thickness of 10 μm is not always necessary.

(10) Refractive Index:
The refractive index was determined based on JIS-K7105-1981 using the following measurement device (measurement range: to 1.87).
  Measurement device: Abbe refractometer 4T (produced by Atago Co., Ltd)
  Light source: sodium D ray
  Measurement temperature: 25° C.
  Measurement humidity: 65% RH
  Mount liquid: methylene iodide
  (A thickness direction is referred to as "MZ".)

(11) Abbe Number:
The Abbe number was determined using the following measurement device.
  Measurement device: prism coupler device PC-2010 (produced by Metricon Co., Ltd.)
  Measurement wavelength: 429.5, 539.0, 632.8 nm
  A dispersion curve was calculated from the refractive indexes at three measurement wavelengths obtained by the above-described determination using Selmyer's equation $(R(\lambda) = a + b/(\lambda^2 - c2))$, refractive indexes at wavelengths of 486 nm, 589 nm and 656 nm were determined, and they were defined as n(486), n(589) and n(656), respectively. Further, the Abbe number was determined from the following equation.

$$\text{Abbe number} = (n(589) - 1)/(n(486) - n(656))$$

(12) Retardation:
The retardation was determined using the following measurement device.
  Measurement device: cell gap inspection device RETS-1100 (produced by Otsuka Electronics Co., Ltd.)
  Measurement diameter: φ5 μm
  Measurement wavelength: 400 to 800 nm
In this measurement, retardations at wavelengths of 450 nm, 550 nm and 650 nm were defined as R(450), R(550) and R(650), respectively.

(13) Dimensional Variation Rate at a Heat Treatment Condition of 200° C. and 30 Minutes (Thermal Shrinkage):
Marks were provided at positions of vertexes of a square of 10 cm×10 cm on a sample of 15 cm×15 cm, and the sample was heat treated in an hot air oven at 200° C. for 30 minutes under a non-load condition. After cooled down to a room temperature, the distances between the respective marks were measured, and the thermal shrinkage was calculated from a dimensional variation between the distances before and after the heat treatment. The respective average values in an arbitrary direction and in a direction perpendicular thereto were calculated, and a lower value was taken.

(14) Dielectric Constant:
The measurement of the dielectric constant was carried out at a measurement temperature of 21° C. using an automatic balancing bridge. The specimen was prepared by applying three terminal electrodes on a sample.
  Measurement device: impedance/gain•face analyzer 4194A (produced by Hewlett Packard Corporation)
  Jig: 16451B DIELECTRIC TEST FIXTURE
  Electrode: conductive silver paste "Dotight" (produced by Fujikurakasei Co., Ltd.)
  Dimension:
    Outer diameter of inside circle of surface electrode: 37 mm
    Inner diameter of outside circle of surface electrode: 37 mm
    Back surface (counter) electrode: 50 mm

(15) Coefficient of Thermal Expansion:
The coefficient of thermal expansion was determined in a cooling process after temperature elevation up to 150° C. An initial sample length at 25° C. and 75% RH was referred to as L0, a sample length at a temperature of T1 was referred to as L1 and a sample length at a temperature of T2 was referred to as L2, and the coefficient of thermal expansion from T1 to T2 was determined by the following equation.

$$\text{Coefficient of thermal expansion (ppm/° C.)} = (((L2-L1)/L0)/(T2/T1)) \times 10^6$$

Measurement device: TMA/SS6000 (produced by Seiko Instruments Inc.)

(16) Coefficient of Moisture Expansion:
A sample was fixed in a high-temperature and high-humidity vessel so that the width of the sample was 1 cm and the length of the sample was 15 cm, it was dehumidified down to a predetermined humidity (about 30% RH), and after the length of the sample film became constant, humidification was carried out (about 80% RH). Although the sample began to elongate by moisture absorption, the moisture absorption reaches an equilibrium condition after about 24 hours, and the elongation of the film also reached an equilibrium condition. The coefficient of moisture expansion was calculated from the amount of elongation at that time by the following equation.

$$\text{Coefficient of moisture expansion (ppm/\% RH)} = \\ (\text{elongation amount (cm)}/(\text{sample length (cm)} \times \\ (\text{difference in humidity})) \times 10^6$$

Example 1

3.7248 g of 4,4'-diaminodiphenylsulfone, 11.1744 g of 3,3'-diaminophenylsulfone and 194 ml of N-methyl-2 pyrrolidone were put into a four neck flask of 300 ml having a stirrer, and they were stirred at a state cooled by ice under a condition of nitrogen atmosphere. After ten minutes through after 30 minutes, 12.1812 g of terephthalic dichloride was added at five divided steps. Further, after stirred for one hour, hydrogen chloride generated by the reaction was neutralized by 1.426 g of lithium carbonate to prepare a transparent polymer solution.

A part of the polymer solution prepared was taken onto a glass plate, and a uniform film was formed using a bar coater. This was heated at 120° C. for 7 minutes to obtain a self-holding film. The film obtained was delaminated from the glass plate and fixed to a metal frame, it was washed in a flowing water for 10 minutes, and further, it was heat treated at 280° C. for 1 minute to prepare an aromatic polyamide film. The respective properties are shown in Tables 1 to 4.

Examples 2-36

A polymer and a film were obtained in a manner similar to that in Example 1 other than conditions where used diamine and acidic chloride were changed to those shown in the following chemical formulae (VII) and (VIII). The respective properties are shown in Tables 1 to 4.

Chemical Formula (VII):

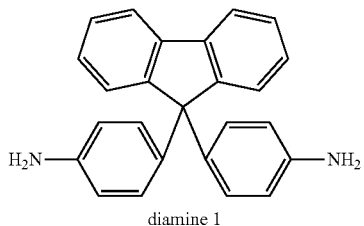

diamine 1

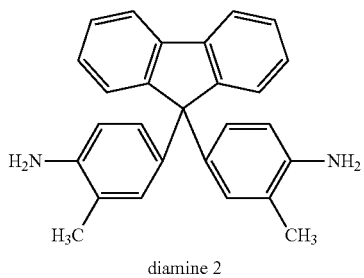

diamine 2

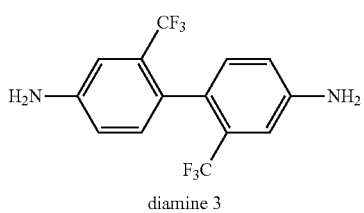

diamine 3

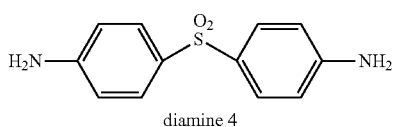

diamine 4

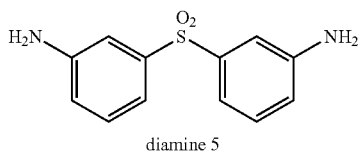

diamine 5

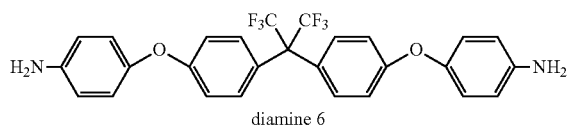

diamine 6

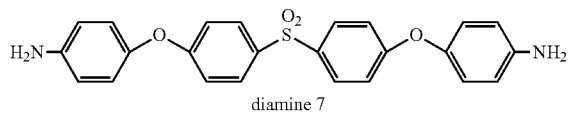

diamine 7

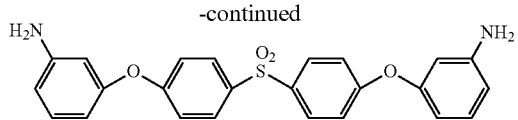

diamine 8

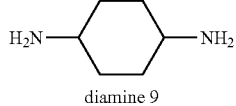

diamine 9

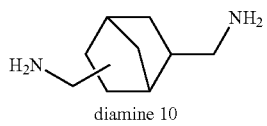

diamine 10

Chemical Formula (VIII):

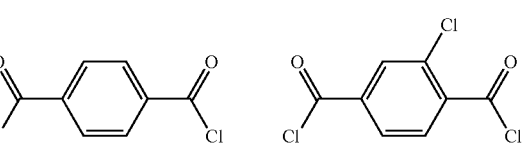

acidic chloride 1    acidic chloride 2

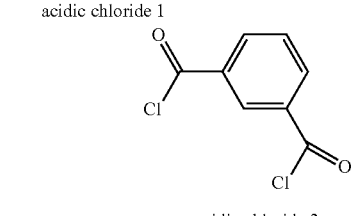

acidic chloride 3

In Table 1, diamine and acidic chloride were used at a same mole as the raw material in all Examples other than Example 22 and Examples 33 and 34. In Example 22, a rate, so that diamine became 101 moles (1 mole excessive) relative to 100 moles of acidic chloride, was employed. In Examples 33 and 34, a rate, so that acidic chloride became 100.5 moles (0.5 mole excessive) relative to 100 moles of diamine, was employed.

Comparative Example 1

12.0 g of paraphenylene terephthalamide and 88.0 g of sulfuric acid of 99.6 wt % were put in a four neck flask of 200 ml having a stirrer, and they were dissolved at 60° C. under a condition of nitrogen atmosphere. The viscosity was 5,000 poise. This dope was cast onto a tantalum belt polished at a mirror surface while being kept at 60° C. After it was maintained on this belt in air with a condition of 90° C. and an absolute humidity of 31 g (water)/kg (dry air) for 14 seconds, it was passed through a zone being blown with a hot air of 110° C. for 4 seconds to prepare a transparent dope having an optical isotropic property. After this dope was coagulated on a moving belt by water of 5° C., it was washed by water, neutralized by 5 wt % sodium hydroxide aqueous solution, washed by water, and these were repeated to obtain a gel film.

Further, this gel film was heat treated in a tenter at 300° C. for 20 minutes to obtain an aromatic polyamide film. In the film obtained, although the light transmittances for all wavelengths from 590 nm to 800 nm were 80% or more, at a wavelength less than 590 nm, the light transmittance was low, and it exhibited a yellow color tone even by observation.

TABLE 1

| | Raw material | | | | | | | | | | | | | |
|---|---|---|---|---|---|---|---|---|---|---|---|---|---|---|
| | diamine (mol %) | | | | | | | | | | acidic chloride | | | |
| | (I) | | (II) | (III) | | | | | | alicyclic | (mol %) | | | Thickness |
| | 1 | 2 | 3 | 4 | 5 | 6 | 7 | 8 | 9 | 10 | 1 | 2 | 3 | μm |
| Example 1 | | | | 25 | 75 | | | | | | 100 | | | 13 |
| Example 2 | | | | 50 | 50 | | | | | | 100 | | | 17 |
| Example 3 | | | | 75 | 25 | | | | | | 100 | | | 16 |
| Example 4 | | | | 100 | | | | | | | 100 | | | 13 |
| Example 5 | | | | 50 | 50 | | | | | | 100 | | | 14 |
| Example 6 | 50 | | | 50 | | | | | | | 100 | | | 16 |
| Example 7 | 50 | | | | 50 | | | | | | 100 | | | 16 |
| Example 8 | | | | 50 | 50 | | | | | | | 100 | | 12 |
| Example 9 | | | | 100 | | | | | | | | 100 | | 15 |
| Example 10 | 100 | | | | | | | | | | 100 | | | 16 |
| Example 11 | | | 100 | | | | | | | | 100 | | | 10 |
| Example 12 | | | | | | 100 | | | | | 100 | | | 15 |
| Example 13 | | | | 50 | | | 50 | | | | 100 | | | 14 |
| Example 14 | | | | 50 | | | | 50 | | | 100 | | | 14 |
| Example 15 | 100 | | | | | | | | | | | | 100 | 16 |
| Example 16 | 100 | | | | | | | | | | | 100 | | 17 |
| Example 17 | | | 100 | | | | | | | | | 100 | | 11 |
| Example 18 | | 100 | | | | | | | | | 100 | | | 13 |
| Example 19 | | | | | | | | | 100 | | 100 | | | 11 |
| Example 20 | | | 100 | | | | | | | | | | 100 | 10 |
| Example 21 | | | | | | | | | | 100 | 100 | | | 12 |
| Example 22 | | | 1 | 50 | 50 | | | | | | | 100 | | 10 |
| Example 23 | | | 2 | 49 | 49 | | | | | | 100 | | | 11 |
| Example 24 | | | 4 | 48 | 48 | | | | | | | 100 | | 10 |
| Example 25 | | | 10 | 45 | 45 | | | | | | | 100 | | 9 |
| Example 26 | | | 20 | 40 | 40 | | | | | | | 100 | | 10 |
| Example 27 | | | 40 | 30 | 30 | | | | | | | 100 | | 10 |
| Example 28 | | | 60 | 20 | 20 | | | | | | | 100 | | 11 |
| Example 29 | | | 60 | 40 | | | | | | | | 100 | | 10 |
| Example 30 | | | 60 | | 40 | | | | | | | 100 | | 13 |
| Example 31 | | | 3 | | 97 | | | | | | 100 | | | 10 |
| Example 32 | | | 5 | | 95 | | | | | | | 100 | | 11 |
| Example 33 | 100 | | | | | | | | | | 50.5 | | 50 | 10 |
| Example 34 | 100 | | | | | | | | | | 25.5 | | 75 | 10 |
| Example 35 | 100 | | | | | | | | | | 40 | | 60 | 12 |
| Example 36 | | | | 100 | | | | | | | | 90 | 10 | 10 |
| Comparative Example 1 | Paraphenylene terephthalic amide is used as a polymer. | | | | | | | | | | | | | 4 |

TABLE 2

| | Mechanical properties | | | | Coefficient of thermal expansion MD ppm/° C. | Coefficient of moisture expansion MD ppm/% Rh | | Tg DMA measurement (DSC measurement) ° C. |
|---|---|---|---|---|---|---|---|---|
| | Young's modulus TD Gpa | Tensile strength TD Mpa | Elongation at breakage TD % | Thermal shrinkage TD % | | | Pencil hardness | |
| Example 1 | 4.3 | 125.6 | 11.6 | | | | | 282.8 |
| Example 2 | 4.2 | 135.9 | 69.6 | 0.5 or less | 42 | 179 | H | 302.2 |
| Example 3 | 4.0 | 114.9 | 15.5 | | | | | 323.1 |
| Example 4 | 3.7 | 120.6 | 46.4 | | | | | 342 |
| Example 5 | 4.3 | 116.8 | 13.9 | | | | | 302.5 |
| Example 6 | 4.0 | 138.9 | 24.1 | | 43 | 102 | | 360 or more (408.1) |
| Example 7 | 4.5 | 146.7 | 11.1 | | 47 | 131 | H | 318.7 |
| Example 8 | 4.9 | 145.4 | 8.1 | | | | H | 283 |
| Example 9 | 4.3 | 167.6 | 64.9 | | 46 | | | 331 |
| Example 10 | 4.0 | 142.4 | 9.9 | 0.5 or less | 40 | 90 | 3H | 360 or more (412.1) |
| Example 11 | 11.4 | 353.7 | 7.2 | 0.5 or less | −10 | 17 | 3H | 290.8 |
| Example 12 | 2.9 | 135.7 | 81.9 | | | | | 249.4 |
| Example 13 | 3.7 | 126.5 | 53.3 | | | | | 304.2 |
| Example 14 | 3.7 | 113.2 | 16.2 | | | | | 270.1 |
| Example 15 | 3.8 | 126.8 | 7.5 | | | | | 350.5 |
| Example 16 | 4.5 | 140.1 | 5.4 | | | | 3H | 360 or more (367.6) |
| Example 17 | 9.1 | 294.0 | 7.6 | | 2 | 21 | 4H | 304 |
| Example 20 | 4.0 | 145.0 | 41.6 | | | | | |
| Example 26 | 5.4 | 156.0 | 9.2 | | 40 | 95 | | |
| Example 27 | 5.8 | 171.0 | 12.0 | | 31 | 62 | | |
| Example 28 | 6.5 | 179.0 | 6.1 | | 22 | 35 | | |

TABLE 2-continued

| | Mechanical properties | | | Thermal shrinkage TD % | Coefficient of thermal expansion MD ppm/°C. | Coefficient of moisture expansion MD ppm/% Rh | Pencil hardness | Tg DMA measurement (DSC measurement) °C. |
|---|---|---|---|---|---|---|---|---|
| | Young's modulus TD Gpa | Tensile strength TD Mpa | Elongation at breakage TD % | | | | | |
| Example 29 | 6.1 | 179.0 | 10.5 | | | | | |
| Example 30 | 6.7 | 179.0 | 3.8 | | | | | |
| Example 35 | 3.1 | 71.0 | 2.8 | | | | | |
| Example 36 | 7.8 | 251.0 | 6.8 | | | | | |

TABLE 3

| | Total light transmittance % | Haze % | Light transmittance % | | | | | | Refractive index | | |
|---|---|---|---|---|---|---|---|---|---|---|---|
| | | | 350 nm | 400 nm | 450 nm | 500 nm | 600 nm | 700 nm | MD | TD | MZ |
| Example 1 | 88.1 | 0.7 | 0.7 | 84.0 | 86.1 | 86.9 | 87.7 | 87.1 | 1.71 | 1.71 | 1.67 |
| Example 2 | 87.6 | 0.4 | 2.3 | 83.0 | 85.7 | 86.7 | 87.6 | 88.6 | 1.71 | 1.71 | 1.67 |
| Example 3 | 87.2 | 0.4 | 0.4 | 81.2 | 85.1 | 86.1 | 87.7 | 88.9 | 1.72 | 1.72 | 1.67 |
| Example 4 | 86.5 | 6.3 | 0.4 | 76.0 | 81.9 | 84.4 | 85.8 | 87.0 | 1.71 | 1.71 | 1.67 |
| Example 5 | 87.9 | 0.6 | 0.6 | 83.0 | 85.7 | 86.5 | 87.7 | 88.1 | 1.72 | 1.72 | 1.67 |
| Example 6 | 87.7 | 0.7 | 0.0 | 65.7 | 85.3 | 86.3 | 87.7 | 85.4 | 1.71 | 1.71 | 1.68 |
| Example 7 | 87.7 | 0.4 | 0.1 | 71.3 | 85.6 | 86.4 | 87.6 | 87.3 | 1.70 | 1.70 | 1.69 |
| Example 8 | 88.0 | 0.7 | 1.0 | 83.3 | 85.3 | 86.1 | 86.9 | 87.4 | 1.70 | 1.70 | 1.67 |
| Example 9 | 88.0 | 0.5 | 0.3 | 81.7 | 85.5 | 86.5 | 89.4 | 85.3 | 1.70 | 1.70 | 1.67 |
| Example 10 | 87.4 | 1.5 | 0.0 | 68.0 | 85.0 | 86.0 | 89.8 | 84.5 | 1.70 | 1.70 | 1.69 |
| Example 11 | 88.2 | 1.1 | 1.8 | 82.0 | 85.0 | 87.0 | 88.3 | 87.5 | 1.68 | 1.68 | 1.52 |
| Example 12 | 89.2 | 0.4 | 0.0 | 61.0 | 87.2 | 86.7 | 91.8 | 91.0 | 1.64 | 1.65 | 1.57 |
| Example 13 | 88.0 | 0.8 | 0.1 | 67.5 | 85.3 | 86.3 | 87.7 | 87.9 | 1.71 | 1.71 | 1.65 |
| Example 14 | 87.8 | 7.0 | 0.6 | 81.8 | 85.1 | 86.3 | 87.0 | 87.8 | 1.70 | 1.70 | 1.67 |
| Example 15 | 87.9 | 0.6 | 0.7 | 83.4 | 85.9 | 86.6 | 87.9 | 87.1 | 1.70 | 1.70 | 1.69 |
| Example 16 | 87.8 | 0.5 | 0.0 | 66.9 | 85.7 | 86.9 | 86.3 | 90.3 | 1.69 | 1.69 | 1.68 |
| Example 17 | 89.5 | 0.5 | 1.1 | 83.6 | 87.0 | 87.9 | 89.2 | 89.6 | 1.64 | 1.64 | 1.53 |
| Example 18 | | | 0.0 | 68.0 | 85.0 | 86.0 | 88.2 | 89.1 | | | |
| Example 19 | | | 54.3 | 87.1 | 88.1 | 88.1 | 89.7 | 89.7 | | | |
| Example 20 | | | 55.7 | 80.5 | 85.2 | 85.0 | 90.4 | 91.0 | | | |
| Example 35 | | | 0.2 | 43.4 | 81.3 | 83.6 | 85.8 | 86.8 | | | |
| Comparative Example 1 | | | 0.0 | 1.0 | 64.0 | 75.0 | 80.8 | 82.5 | | | |

TABLE 4

| | Abbe number | Retardation of non-stretched film nm | | | $\Delta n \times 10^{-3}$ λ550 nm | Conditions | Retardation of film after stretching nm | | |
|---|---|---|---|---|---|---|---|---|---|
| | | λ450 nm | λ550 nm | λ650 nm | | | λ450 nm | λ550 nm | λ650 nm |
| Example 1 | | 63.3 | 55.0 | 50.2 | 4.4 | | | | |
| Example 2 | 15.5 | 24.5 | 21.1 | 19.1 | 1.2 | 300° C./1.5 times | 1572.3 | 1346.7 | 854.7 |
| Example 3 | | 16.4 | 13.9 | 12.4 | 0.9 | | | | |
| Example 4 | | 35.7 | 29.9 | 26.5 | 2.2 | 300° C./1.1 times | 530.7 | 448.9 | 401.9 |
| Example 5 | | 7.7 | 6.8 | 6.2 | 0.5 | | | | |
| Example 6 | | 14.2 | 11.6 | 10.1 | 0.7 | 300° C./1.05 times | 194.3 | 162.6 | 152.4 |
| Example 7 | | 13.1 | 10.9 | 9.6 | 0.7 | 350° C./1.1 times | 168.2 | 143.7 | 129.5 |
| Example 8 | 17.5 | 5.1 | 4.5 | 4.2 | 0.4 | 280° C./1.7 times | 999.2 | 862.5 | 783.8 |
| Example 9 | | 19.7 | 16.4 | 14.5 | 1.1 | 320° C./1.2 times | 671.7 | 569.7 | 511.0 |
| Example 10 | 16.1 | 6.7 | 5.6 | 4.9 | 0.3 | 110° C.ˣ/1.5 times | 467.8 | 370.7 | 314.8 |
| Example 11 | 15.3 | 197.8 | 173.2 | 159.0 | 17.3 | 280° C./1.1 times | 971.3 | 848.4 | 777.7 |
| Example 12 | | 11.0 | 9.7 | 8.9 | 0.7 | 300° C./1.6 times | 2248.2 | 1964.0 | 1800.6 |
| Example 13 | 15.4 | 22.0 | 18.8 | 16.9 | 1.3 | 300° C./1.2 times | 969.2 | 832.3 | 753.6 |
| Example 14 | 16.1 | 33.4 | 28.4 | 25.5 | 2.0 | 270° C./1.1 times | 198.9 | 194.0 | 191.1 |
| Example 15 | | 4.6 | 3.5 | 2.9 | 0.2 | 320° C./1.1 times | 58.6 | 49.8 | 44.8 |
| Example 16 | 16.9 | 8.2 | 6.7 | 5.9 | 0.4 | 350° C./1.1 times | 161.0 | 132.3 | 115.8 |
| Example 17 | 16.1 | 16.4 | 14.3 | 13.0 | 1.3 | 300° C./1.1 times | 1054.4 | 927.6 | 854.7 |

ˣStretched at gel-film stage at the time of film formation
Δn: birefringence of non-stretched film

The invention claimed is:

1. A polyamide film comprising a structural unit represented by the following chemical formula (II) or (III) and satisfying the following equations (1) to (2) when molar fractions of structural units represented by the following chemical formulae (II) and (III) are referred to as "m" and "n", respectively:

$$m+n=100 \quad (1)$$

$$1 \leq m,n \leq 99 \quad (2)$$

chemical formula (II):

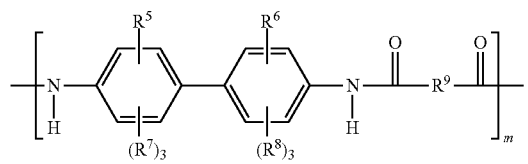
(II)

$R^5$: $CF_3$,
$R^6$: $CF_3$,
$R^7$: H,
$R^8$: H, and
$R^9$: substituted phenyl or biphenyl, represented by the following formulae:

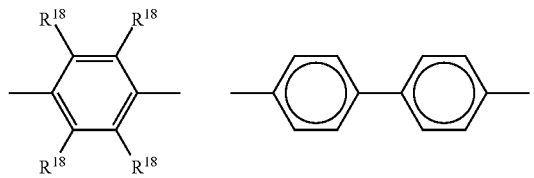

where $R^{18}$: independently respectively, H, D (deuterium), halogen, aromatic group, hydrocarbon having a carbon number of 1 to 5, or halogenated hydrocarbon having a carbon number of 1 to 5, chemical formula (III):

(III)

$R^{10}$: $SO_2$,
$R^{11}$: H,
$R^{12}$: H,
$R^{13}$: linked directly or a group having a carbon number of 6 to 12 which has at least a phenyl group as an inevitable component,
$R^{14}$: linked directly or a group having a carbon number of 6 to 12 which has at least a phenyl group as an inevitable component, and
$R^{15}$: phenyl, substituted phenyl or biphenyl, represented by the following formulae:

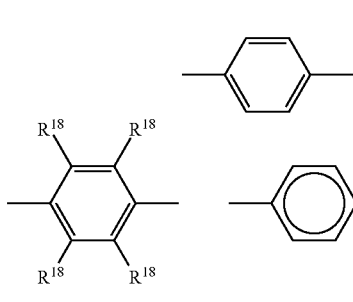

where $R^{18}$: independently respectively, H, D (deuterium), halogen, aromatic group, hydrocarbon having a carbon number of 1 to 5, or halogenated hydrocarbon having a carbon number of 1 to 5, having a Young's modulus in at least one direction of 4 GPa or more, a Tg of 300° C. or higher and exhibiting a light transmittance of 80% or more for all lights with wavelengths of from 450 nm to 700 nm and a light transmittance for a light with a wavelength of 400 nm of 75% or more.

2. The polyamide film according to claim 1, comprising a copolymer in an amount of 50 wt % or more.

3. The polyamide film according to claim 2, wherein a thickness of said film is in a range of 0.01 to 1,000 µm.

4. The polyamide film according to claim 3, wherein light transmittances of all lights with wavelengths of from 450 µm to 700 nm of said film are 80% or more, and a thickness of said film is in a range of 1 µm to 100 µm.

5. The polyamide film according to claim 2, wherein a light transmittance for a light with a wavelength of 400 nm of said film is 60% or more.

6. The polyamide film according to claim 2, wherein a Young's modulus in at least one direction of said film is 8 GPa or more.

7. The polyamide film according to claim 2, wherein a thermal shrinkage in at least one direction of said film at a heat treatment condition of 200° C. and 30 minutes is 1% or less.

8. The polyamide film according to claim 2, wherein a refractive index in at least one direction at a sodium D ray of said film is 1.7 or more.

9. The polyamide film according to claim 2, wherein a retardation of a light with a wavelength of 550 nm of said film is 0 nm or more and less than 10 nm.

10. The polyamide film according to claim 2, wherein a retardation of a light with a wavelength of 550 nm of said film is 10 µm or more and 2,000 µm or less.

11. The polyamide film according to claim 2, wherein, when a retardation of a light with a wavelength of 550 nm of said film is referred to as R(550) and a retardation of a light with a wavelength of 450 nm of said film is referred to as R(450), said film satisfies R(450)<R(550).

12. The polyamide film according to claim 2, wherein a birefringence of a light with a wavelength of 550 nm of said film is 0 or more and less than 0.1.

13. The polyamide film according to claim 2, wherein a birefringence of a light with a wavelength of 550 nm of said film is 0.1 or more and less than 0.5.

14. The polyamide film according to claim 2, wherein said polyamide is aromatic.

15. An optical member comprising the polyamide film according to claim 2.

16. The optical member according to claim 15, wherein said member is a substrate for a flat panel display.

17. The optical member according to claim 15, wherein said member is a substrate for a solar battery.

18. The optical member according to claim 15, wherein said member is an antireflection membrane.

19. The optical member according to claim 15, wherein said member is a retardation film.

20. The optical member according to claim 15, wherein said member is a touch panel.

21. The optical member according to claim 15, wherein said member is an optical fiber.

22. The optical member according to claim 15, wherein said member is an optical waveguide.

23. The optical member according to claim 15, wherein said member is a lens.

24. An optical member comprising the polyamide film according to claim 1.

* * * * *

UNITED STATES PATENT AND TRADEMARK OFFICE
CERTIFICATE OF CORRECTION

| | |
|---|---|
| PATENT NO. | : 8,153,753 B2 |
| APPLICATION NO. | : 10/533006 |
| DATED | : April 10, 2012 |
| INVENTOR(S) | : Moriyama et al. |

It is certified that error appears in the above-identified patent and that said Letters Patent is hereby corrected as shown below:

On the Cover Page

Item (22), please change the PCT filing date from "April 7, 2004" to --October 28, 2003--, and at (86), please change the PCT No.: from "PCT/JP2004/004982" to --PCT/JP2003/13790--.

Signed and Sealed this
Fourteenth Day of August, 2012

David J. Kappos
*Director of the United States Patent and Trademark Office*